Sept. 5, 1967             C. CURTIS             3,340,402
AUXILIARY BATTERY SYSTEM FOR MOTOR VEHICLES
Filed Sept. 24, 1964
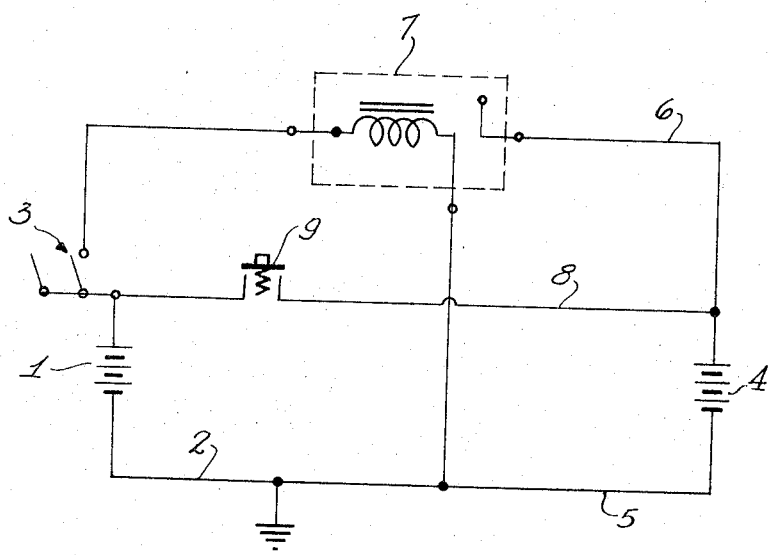
INVENTOR
Carl Curtis
BY Harold A. Weir
PATENT AGENT

United States Patent Office 3,340,402
Patented Sept. 5, 1967

3,340,402
AUXILIARY BATTERY SYSTEM FOR MOTOR VEHICLES
Carl Curtis, R.R. 3, Cobourg, Ontario, Canada
Filed Sept. 24, 1964, Ser. No. 398,974
1 Claim. (Cl. 307—48)

ABSTRACT OF THE DISCLOSURE

A standby battery is connected in parallel with the conventional battery, a switch in the standby battery connection has a normally open position disconnecting the standby battery from the main electrical circuit and a closed position responsive to manual operation connecting the standby battery to the main circuit. Means are also provided for connecting the standby battery to the main circuit in response to closing of the motor starting switch whereby the standby battery is connected to the main circuit when the motor of the vehicle is running.

---

This invention relates to an auxiliary battery system for motor vehicles.

It is frequent practice in modern-day motor cars to utilize the battery as a source of power for operating various auxiliary devices such as, for instance, a telephone. The use of such an auxiliary device, more particularly if it involves the use of power during periods when the motor car is not running and, therefore, acting to discharge the battery, frequently results in an excessive drain upon the battery with the result that the battery is often incapable of operating the car starter.

An object of the present invention is to provide an auxiliary electrical system for motor vehicles which may be easily and conveniently incorporated in the electrical power system of a conventional motor vehicle, which is simple and effective in operation, and which provides a more dependable source of standby power.

The auxiliary electrical system of the present invention is employed in combination with the standard electrical system of a motor vehicle having a main circuit, a battery in the circuit, and a main ignition switch. The auxiliary system comprises a second battery and circuit means connecting the second battery with the main circuit. The circuit means includes first and second electrical connections. A solenoid-operated switch in the first connection has an open position disconnecting the second battery from the main circuit and a closed position responsive to closing of the main ignition switch connecting the second battery with the main circuit. A manually-operable switch is provided in the second connection for selective connection of the second battery into the main circuit.

The invention will be described with reference to the accompanying drawing wherein the single figure is a schematic wiring diagram of the electrical system of the present invention.

In the drawing, 1 is the main battery of a conventional motor vehicle electrical system, the main circuit of which is generally indicated at 2.

It will be understood that the usual starter motor generator and connections to accessory devices such as lamps, radio, heater and the like, have been omitted for clarity of illustration. The main ignition switch is indicated at 3.

In accordance with the invention, a second battery 4 which must be of the same voltage as battery 1, is provided and is connected to the main circuit by circuit means 5. The circuit means includes a first connection 6 to the main circuit and having therein a solenoid switch 7.

The circuit means also includes a second connection 8 to the main circuit by-passing the solenoid switch and having therein a manually operable push button switch 9.

It will be appreciated that the push button switch 9 is located on the vehicle dash and conveniently accessible to the vehicle driver.

With the ignition switch 3 open (the vehicle being stopped and the motor not running), the solenoid switch 7 will be open and thus the battery 4 will be isolated from the main circuit as well as the accessory devices such as radio, telephone and the like, which may be operated by deriving power from the main battery 1. However, as soon as main ignition switch 3 is closed, in order to start the motor of the vehicle, solenoid switch 7 will be actuated to close the same and battery 4 will then be connected to the main circuit and since it will be connected in parallel with battery 1, both batteries will be subjected to charging by the generator of the system.

It will be appreciated that only a small amount of energy will be required to actuate the solenoid of the switch 7 and thus, this switch will be actuated even though battery 1 is incapable of delivering sufficient power to operate the starting motor of the vehicle. With switch 7 closed, energy from battery 4 is, of course, available for operating the starting motor.

Should battery 1 be completely "dead" and incapable of actuating the solenoid of switch 7, the operator may connect battery 4 to the starting circuit by actuating push button switch 9. It will be understood that this is an essential feature of the invention in that battery 4 is available for the supply of starting energy under all circumstances. Moreover, it will be appreciated that, with battery 1 "dead," battery 4 acts as a complete substitute therefor capable of supplying all electrical needs of the system. In other words, the entire electrical system of the vehicle, including all accessory devices, may be operated from either one or both of the batteries.

It should therefor be emphasized that while battery 4 is utilized exclusively as a standby source of power for vehicle starting purposes the complete failure of either battery will not disturb the normal operation of the motor vehicle. There is no depletion of this energy when the motor vehicle motor is stopped and since it is subject to normal charging procedure when the vehicle is running, it constitutes a substantially unfailing source of standby starting power.

I claim:

In combination with a motor vehicle electrical system having a main circuit, a power supply battery in said circuit, a motor-starter connection including a motor-starting ignition switch connected to said main circuit, a standby battery having a connection to said main circuit connecting said standby battery in parallel with said first battery, a switch in said standby battery connection having a normally open position disconnecting said standby battery from said main circuit and a closed position responsive to manual operation connecting said standby battery to said main circuit, and means connecting said standby battery to said main circuit in response to closing of said motor-starting switch comprising a second connection connecting said standby battery to said motor-starting switch, and a solenoid-operated switch in said second connection having a normally open position disconnecting said standby battery from said motor-starting switch and a closed position responsive to closing of said motor-starting switch.

References Cited

UNITED STATES PATENTS

| | | | |
|---|---|---|---|
| 2,051,514 | 8/1936 | Block | 320—40 |
| 2,629,059 | 2/1953 | Baumheckel | 320—6 X |
| 2,692,953 | 10/1954 | Markett | 290—37 X |
| 2,730,630 | 1/1956 | Bruno | 307—10 X |
| 2,930,901 | 3/1960 | Freeman | 307—48 X |
| 3,108,190 | 10/1963 | Gebhard | 307—48 X |

ORIS L. RADER, *Primary Examiner.*

T. J. MADDEN, *Assistant Examiner.*